Aug. 2, 1955 W. H. SHEFFIELD ET AL 2,714,559
COATED PLASTIC SHEET AND METHOD OF MAKING SAME
Filed March 27, 1950

INVENTOR.
KARL W. KOENIGER
CHARLES B. HEMMING
BY WILLIAM H. SHEFFIELD

James M. Heilman
atty.

United States Patent Office 2,714,559
Patented Aug. 2, 1955

---

2,714,559

COATED PLASTIC SHEET AND METHOD OF MAKING SAME

William H. Sheffield, West Englewood, and Karl W. Koeniger, South Orange, N. J., and Charles B. Hemming, New Rochelle, N. Y., assignors, by mesne assignments, to United States Plywood Corporation, New York, N. Y., a corporation of New York Application March 27, 1950, Serial No. 152,157

7 Claims. (Cl. 117—9)

This invention relates to unsupported plastic sheeting or film generally and particularly to transparent or substantially transparent vinyl sheeting and the process for converting it into a decorative material. The invention relates specifically to a limp vinyl sheet which, while it can be used as upholstery, as covering for traveling bags, cabinets, cases, floors, ceilings, etc., is specifically designed and constructed so that it can be successfully applied as a permanent wall covering and thereby eliminate the necessary expense and trouble of repainting and repapering.

Prior to this invention, the method of producing a colored vinyl sheet has been to compound the desired coloring pigments with the vinyl resins and then to calender or cast the sheet with suitable equipment. The resultant product had the same color throughout and, since it was almost completely opaque, the color had no apparent depth. In an attempt to achieve an illusion of depth and to obtain a combination of colors, the prior method has been to print, or otherwise to apply, additional colors to the outer or finished side of the opaque sheet. Since these secondary colors were on the outer or wearing surface, they would be removed readily, when the material was in use, by wear, abrasion, or solvents.

From the standpoint of merchandising and utility, the prior products had three major disadvantages: first, to manufacture the prior products economically, it was necessary to make relatively large quantities or batches of material having the desired color; second, if colors or printed patterns or other effects were applied to the face of the sheet, they were subject to abrasive wear or removal by solvents; third, when embossed and printed, the resultant sheet lacked depth and character.

This invention has seven main features, as follows:

1. The applying of a color or colors to the reverse or non-wearing surface of a substantially transparent film or sheet.
2. Producing a two tone or "antique" effect by spraying in spots or in streaks a first coat before the color coat or coats are applied.
3. Embossing from the face side of the sheet to the rear so as to produce surface texture, grain, or pattern.
4. The use of flock as a backing material or as a rear surface for the laminated construction so as to make the vinyl sheeting commercially applicable to a supporting surface, such as, a wall, and as a protection for the color coat.
5. Using an aluminum pigmented adhesive to secure the flock to the sheet so as to give the required opacity, thereby greatly increasing the hiding power of the color coats.
6. Providing a means for readily obtaining any desired color or combination of colors suitable for decorative and utilitarian purposes so that the finished product will have a depth of color which will measurably increase its beauty and attractiveness, and still be able to be manufactured economically in either large or small quantities.
7. Providing a decorative material in which a purchaser may obtain his pattern, design, combination of colors, or decorative effect in small production quantities know to the industry as cut lots. This in effect defines the material as a medium of expression so highly desired and prized by designers, decorators, architects, etc.

With the foregoing and other objects in view as will appear from a reading of the following specification and claims, the invention resides in the novel arrangement and combination of parts and in the details of construction and process of manufacture hereinafter described and claimed, it being understood that changes in the precise embodiment of the invention may be made within the scope of what is claimed without departing from the spirit of the invention. It will be further understood that our invention is susceptible of embodiment in many and various forms, some of which are illustrated in the accompanying drawing, and that the structural details or particular steps of the method herein set forth may be varied to suit particular purposes and still remain within our inventive concept.

Figure 2:
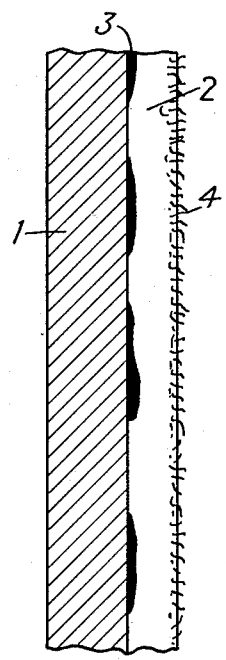
Fig. 2 illustrates the same type material having been "antiqued" or two toned by having a random mist coating and a final color coat applied thereto, after which flock is shaken over the basic color coat while it is still wet so that the flocking material will become embedded in the surface of the color.
Figure 3:
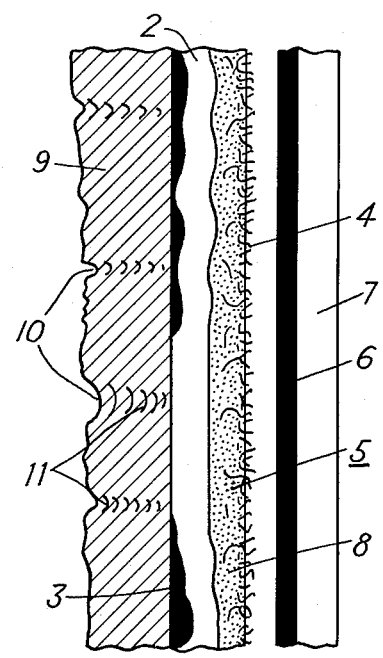

Fig. 3 discloses a variation of the above construction about to be applied to a supporting wall. The surface is embossed to produce an interesting texture effect, and the flocking is applied to an aluminum pigmented flocking adhesive. For clarity, the various coats, i. e., 2, 3, 5, and 6, are enlarged relative to the plastic sheet, and the embossing and undulating surfaces of the plastic sheet are exaggerated. The construction illustrated in Figs. 2 and 3 could be used for upholstery, traveling bags, etc. as readily as for application to rigid supporting surfaces.

A transparent, substantially transparent, or highly translucent sheet of vinyl resins compounded with suitable plasticizers and stabilizers, 1, has applied to what may be designated the rear surface, such color 2, pattern or combination of colors and patterns as may be desired. This type of construction (see Fig. 1) is particularly suitable for upholstery or other work in which the material will be nailed rather than glued to the object to be covered. The thickness of the sheeting may be varied, depending upon its application. For example, for heavy duty, such as, a wall covering, it should be approximately .023" thick, while for light duty, such as, book covers, it might be approximately .012" thick. The color and adhesive coats, i. e., 2, 3, 5, and 6, are approximately .002 to .003 inch thick for best results.

Preferably, basic color coat 2 is one color and may be sprayed or otherwise applied by any means, such as, printing, coating, or by successive banks of sprayers, the number of banks and the number of sprayers in each bank being dependent upon the thickness of the coat desired and the area or width of the sheet as it passes through the spraying zone. For example, four banks of sprayers depositing four coats or sub-coats to form color coat 2 have been found satisfactory. In certain cases, it has been found desirable to use different colors in certain spray banks to form color 2.

It has been found that if, in addition to the composite basic color coat 2, a thin or mist coating 3 is irregularly sprayed or otherwise irregularly deposited directly on the sheet in the form of spots or streaks (as shown in Figs. 2 and 3), an unusually attractive two tone or "antique" finish will result in the finished product. The difference in the colors plus the unequal thicknesses of the color accentuates the appearance of depth and produces a slight, but clearly discernible, two tone appearance. The "antiquing" color coat may comprise one or more sub-coats and one or more colors sprayed at random over the surface of the sheet. It has been found, for instance, that a mist "antiquing" color in either white or black, depending upon the particular solid background color which is used, produces striking effects.

If desired, flocking 4, of any type material, i. e., cotton, wool, rayon, etc., may be sifted directly onto the outer surface of the color coat or coats 2 or onto the flocking adhesive 5. The one end of the flock becomes securely embedded in the color or adhesive coat, while the free ends of the flock serve to entwine themselves in the bonding mastic or adhesive 6 which is shown in Fig. 3 as applied to the wall 7. As stated before, the flocking may be applied directly to the wet basic color coat (or coats) as it is drying and is being fused to the vinyl sheet. However, the flocking will not stick properly to most color tints, so an aluminum pigmented adhesive has been developed (a clear synthetic resin solution might also be used) in which surface the flock will become permanently embedded. This adhesive resin will hold the fibers, has sufficient elasticity, and will not itself cause, or permit the adhesive used to bond the sheet to a supporting surface to cause, discoloration or disturbance of the color coatings or of the sheet itself. Another function of the flocking is that in colors of low opacity it increases slightly the hiding power and makes the colors appear purer when the sheeting is held against a dark background. It is understood, of course, that the bonding adhesive 6 could as easily be first applied to the flock as to the wall which it is desired to cover.

It has been found that if aluminum powder 8 is mixed throughout the flocking adhesive 5, the opacity or hiding power of the basic color coat 2 is greatly increased. We have found that whereas four coats or sub-coats were necessary to produce a satisfactory color coat 2 before inventing the aluminum additive, at the present time, better hiding power and better results are produced with two sub-coats if aluminum powder or small aluminum flakes are added to the flocking adhesive.

It is preferred that the plastic sheeting be rolled and shipped like wallpaper and that the mastic 6 be applied at the time the material is to be applied to the supporting surface to be covered. However, if desired, the material could be sold with a cold, pressure sensitive adhesive applied to the outer surface of the flock during manufacture, or with an adhesive needing a hot iron or other heat to bond the assembly to a wall, and thereby eliminate the mastic 6 on the job, or with an adhesive to be reactivated with solvents at time of installation.

Figure 1:
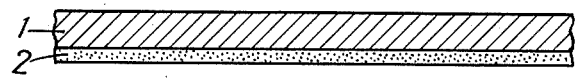
Fig. 1 illustrates a substantially transparent plastic film having a single color, of one or more coats, on its non-wearing surface. Material so treated might be used for upholstery, etc.

As illustrated in Fig. 3, the sheeting 9 may be embossed to give it a textured or grained effect, for example, to resemble leather. Whereas, the sheeting illustrated in Figs. 1 and 2 is plain, the material in Fig. 3 *is wavy* throughout and at certain areas is embossed as at 10 which sets up pressure lines 11 from the face to the rear surface along the line of the embossing. In certain cases, the embossing causes a slight distortion on the reverse surface. These pressure lines and the distortion, if any, in the rear surface cause the light rays to be slightly distorted and thereby enhance the results.

Since the basic material is a clear sheet, it is apparent that either large or small quantities of any desired color can be produced economically and without significant waste. Because the color or colors are observed through a transparent film, thus giving the impression of depth, the product produced by this method is much more brilliant and attractive than any made by the prior art. This phenomenon is achieved due to the high refractive index, i. e., 1.53 of vinyl film through which the light rays must pass. In other words, the color reflected is not a surface or body reflection but is the color reflected from the rear which has been modified and given depth by the particular characteristics of the vinyl film.

All color and/or patterns are applied to the back of the sheet, where they are protected from wear by the thickness of the vinyl sheet itself. It cannot be worn off or removed with solvents, and, in fact, the color coating actually adds to the basic strength of the film.

The flock backing is essential to secure the vinyl film not only to porous supporting surfaces, such as, plaster, lumber, plywood, plaster boards and composition boards, but also for bonding to non-porous surfaces, such as, metal and high pressure laminates. While the addition of a flocked surface to the back of unsupported vinyl sheeting is absolutely essential for satisfactory installation in the wall covering field, it is also of advantage in the upholstery field since the flock makes it possible to attach, easily and inexpensively, a gummed fabric tape as a reinforcing member at seams, welts and tacking edges. This treatment eliminates the one major disadvantage of unsupported vinyl sheeting, namely, the tendency to tear as a result of tiny cuts started by sewing or tacking.

Since vinyl sheetings were first developed, it has been generally recognized that their high degree of resistance to abrasive wear and staining would make them desirable for use as a wall covering, table and counter tops, luggage, etc. While a solution of vinyl resins will adhere well to vinyl sheeting, it has little or no adhesion for any other material. It is, therefore, very difficult to make the sheeting adhere to anything else by any commercially practical methods that will not stain or harm the vinyl film.

Because vinyl films are highly impervious to moisture and solvents, some adhesives would not set up sufficiently to develop their normal bond strength for months, if at all. Other adhesives will discolor the film if subjected to heat or ultraviolet light or by virtue of chemical reaction with the components of the sheet. Most solvents commonly used would volatilize more rapidly then the resultant vapor could pass through the sheet or the surface to which it was bonded. This would cause solvent blisters which would be difficult to repair.

If a water-soluble or emulsion type adhesive were used on porous materials, solvent blisters would be eliminated. However, no adhesive of this type would adhere satisfactorily to vinyl. It was discovered that some other material to which adhesives would adhere had to be combined with the vinyl during its manufacturing process. Fabric will not work because the elasticity of unsupported film would be lost and the pattern of the fabric frequently would show through the finished sheet. Papers of various types were tested but papers would tear long before the elastic limit of the film was reached. Furthermore, the final bond strength could not be greater than the resistance of the paper to delamination.

Our flocked sheet may be readily bonded to porous surfaces 7 either in the shop or in the field, with emulsion or other water-soluble adhesives 6 of the type usually used for applying fabrics or paper to walls, and which adhesives are totally unsatisfactory for bonding the unflocked sheet to a wall. Unlike paper or cloth, the flock embedded in or attached to the back of the film does not cause any substantial change in the elasticity or other physical characteristics of the unsupported film.

In bonding to non-porous surfaces, methods have been developed for shop fabrication and for field fabrication. In connection with the shop fabrication, a special hot bond adhesive has been developed. A uniform coat of this adhesive is placed on the flocked plastic sheet and on the base material of steel, aluminum, high pressure laminate, concrete, etc. After the adhesive has dried, the elements are placed under heat and pressure sufficiently long to set the adhesive. Actual tests show that the finished material may be stamped, rolled, or bent into various shapes without noticeably disturbing the adhesive bond. The combining of the strength and rigidity of metal with the beauty and durability of the sheeting for large applications has never, to our knowledge, been done before.

For field erection to non-porous materials, both the vinyl sheet and the surface to which it is to be applied are given a coat of the same adhesive mentioned above. The adhesive is allowed to dry until the bulk of the solvent has evaporated. A small area of both surfaces is then reactivated with a dilute mixture of the adhesive. When it is tacky, the film is applied with a roller or stiff bristle brush. This process is repeated until the entire area has been covered.

The general steps for processing the material (as in Fig. 3) are as follows:

1. The vinyl resin is calendered into flat sheet form.
2. If a textured design is desired, the calendered sheet is embossed on what will be its face surface while it is heated. This step may be omitted.
3. If an "antique" or two tone effect is desired, the calendered sheet is sprayed on its rear surface with a mist coating which will provide color in spots and streaks so that a non-uniform thickness of color occurs. This step may be omitted.
4. Applying a basic color coat of one or more sub-coats.
5. Applying an aluminum pigmented flocking adhesive coat.
6. Shaking finely divided flock over adhesive coat while it is still wet or tacky.
7. Vibrating or beating the sheet to embed the fibers.
8. Baking the sheet so that a final fusion of the applied coatings and the vinyl sheet will occur.
9. Festooning or drying.
10. Vacuum cleaning to remove any excess flock or dirt.
11. Rewinding for storage and shipment.

It is thus seen that a wall covering of protected and outstanding beauty, permitting ease of application, has been produced. The wall covering has no odor, is chemically inert, is unaffected by oils and greases, if soiled can be easily cleaned, has high water resistance, excellent toughness and flexibility, will not support combustion, and is resistant to aging and weathering. The two main functional features of this material are:

1. Maintenance is eliminated or substantially reduced because dirt, finger and heel marks will not show. Also, the color coat is unaffected by the action of powerful cleaners.
2. Expression is obtainable by decorators because small lots may be economically produced.

The foregoing invention is described in detail in connection with transparent vinyl sheeting, and particularly in connection with transparent copolymers of vinyl chloride and vinyl acetate, polyvinyl chloride, polyvinyl acetate, and polyvinyl acetals. However, the best results are obtained when copolymers of vinyl chloride and vinyl acetate containing 93% or more by weight of the polyvinyl chloride component are used. Where a dull or mottle finish is desired, a translucent vinyl sheet may be used. However, the invention has its greatest usefulness, producing its most brilliant color and its most startling and most unobvious result in connection with transparent vinyl sheeting. However, somewhat the same results may be achieved, to a lesser degree, by the use of other types of plastic sheeting, such as, vinylidene chloride, a copolymer of butadiene acrylonitrile and vinyl chloride; isobutylene styrene copolymers; and copolymers of cyclopentadiene with isobutylene and styrene.

Obviously, the various features mentioned in connection with one specific type product may be readily used in another. For example, the sheeting illustrated in Figs. 1 and 2 might be embossed, the construction of Fig. 2 could have the flocking applied to an added flocking adhesive similar to Fig. 3, the mist or two tone color 3 in Fig. 3 could be eliminated, a design or pattern could supplant or be supplementary to one or both color groups, etc. Likewise, cloth, canvas, or similar flexible material could be substituted for the flock 4, but some of the desirable features of our invention would be lost.

What we claim is:

1. A decorative covering comprising a plastic sheeting having optical characteristics within the range of translucency to transparency, a mist coating of irregular thickness applied at random intervals to that surface of said sheeting which is opposite the wear surface thereof and a basic color coat having a different tone than said mist coating applied over said mist coating and first mentioned surface whereby said mist coating and said basic color coat are protected against wear, but are visible from said wear surface side, and a comminuted flocking material having the individual ends thereof adhesively embedded in said basic color coat and the free ends thereof extending from the surface of said basic color coat whereby the hiding power of said covering is enhanced and said covering may be applied to a surface by means of an adhesive.

2. A decorative covering comprising a plastic sheeting having optical characteristics within the range of translucency to transparency, a mist coating of irregular thickness applied at random intervals to that surface of said sheeting which is opposite the wear surface thereof and a basic color coat different than the color of the mist coating applied over said mist coating and first mentioned surface whereby said mist coating and said basic color coat are protected against wear, but are visible from said wear surface side, a flocking adhesive covering said basic color coat, and a comminuted flocking material having the individual ends thereof securely embedded in said adhesive while the opposite ends of said material are free so that a soft napped surface is provided for increasing the hiding power of said basic color coat and for permitting bonding said covering to a supporting object by means of an adhesive.

3. A decorative covering comprising a plastic sheeting having optical characteristics within the range of translucency to transparency, a fine coating applied at intervals to that surface of said sheeting which is opposite the wear surface thereof and a basic color coat different than the color of the fine coating applied over said fine coating and first mentioned surface whereby said fine coating and said basic color coat are protected against wear, but are visible from said wear surface side, a flocking adhesive covering said basic color coat, an aluminum powder mixed in said adhesive to increase the hiding power of said basic color coat, and a comminuted flocking material having the individual ends thereof securely embedded in said adhesive while the opposite ends of said material are free so that a soft napped surface is provided for further increasing the hiding power of said basic color coat and for permitting bonding said covering to a supporting object by means of an adhesive.

4. A decorative covering comprising a plastic sheeting for wall application having optical characteristics within the range of translucency to transparency, a mist coating of irregular thickness applied at random intervals to that surface of said sheeting which is opposite the wear surface thereof and a basic color coat different than the color of said mist coating applied over said mist coating and first mentioned surface whereby said mist coating and said basic color coat are protected against wear, but are visible from said wear surface side, a flocking adhesive covering said basic color coat, an aluminum powder mixed in said adhesive to increase the hiding power of said basic color coat, and a comminuted flocking material having the individual ends thereof securely embedded in said adhesive while the opposite ends of said material are free so that a soft napped surface is provided for increasing the hiding power of said basic color coat and for permitting bonding said covering to a supporting object by means of an adhesive.

5. A decorative covering comprising a plastic sheeting having optical characteristics within the range of translucency to transparency and having the wear surface thereof embossed to resemble leather, with the pressure lines caused by the embossing extending to the rear surface of said sheeting, a mist coating of irregular thickness applied at random intervals to said rear surface and a basic color coat different than the color of said mist coating applied over said mist coating and said rear surface, whereby said mist coating and said basic color coat are protected against wear, but are visible from said wear surface side, a flocking adhesive covering said basic color coat, an aluminum powder mixed in said adhesive to increase the hiding power of said basic color coat, and a comminuted flocking material having the individual ends thereof securely embedded in said adhesive while the opposite ends of said material are free so that a soft napped surface is provided for still further increasing the hiding power of said basic color coat and for permitting bonding said covering to a supporting object by means of an adhesive.

6. The method of making a decorative covering comprising the calendering of a substantially clear vinyl resin into a flat substantially transparent sheet, then applying a mist coating of irregular thickness at random intervals to the rear surface of said sheet, applying a basic color coat different than the color of said mist coating over said mist coating and to the rear surface of said sheet, and subsequently adhering the ends of a backing material of finely-divided flock to said basic color coat.

7. The method of making a decorative covering comprising the calendering of a substantially clear vinyl resin into a flat substantially transparent sheet, applying a mist coating of irregular thickness at random intervals to the rear surface of said sheet, applying a basic color coat, different in color than the mist coating, over said mist coating and to the rear surface thereof, applying a flocking adhesive to which an aluminum powder has been mixed to the rear surface of said basic color coat, and subsequently applying a backing material of finely divided flock by the ends thereof to said flocking adhesive.

References Cited in the file of this patent

UNITED STATES PATENTS

| Number | Name | Date |
|---|---|---|
| 2,125,341 | Hall et al. | Aug. 2, 1938 |
| 2,290,238 | Hickok | July 21, 1942 |
| 2,354,049 | Palmquist | July 18, 1944 |
| 2,354,857 | Gits | Aug. 1, 1944 |
| 2,374,940 | Kemmler et al. | May 1, 1945 |
| 2,404,073 | Karfiol | July 16, 1946 |
| 2,455,777 | Jones | Dec. 7, 1948 |
| 2,477,300 | Karfiol | July 26, 1949 |
| 2,494,848 | Whitelegg | Jan. 17, 1950 |
| 2,561,513 | Horback et al. | July 24, 1951 |
| 2,563,259 | Miller | Aug. 7, 1951 |
| 2,565,491 | Francis | Aug. 28, 1951 |
| 2,568,126 | Keeley | Sept. 18, 1951 |

FOREIGN PATENTS

| 860,650 | France | Oct. 7, 1940 |